United States Patent
Taniguchi (10) Patent No.: US 9,444,313 B2
(45) Date of Patent: Sep. 13, 2016

(54) ROTARY ELECTRIC MACHINE AND DRIVING APPARATUS USING THE SAME

(71) Applicant: DENSO CORPORATION, Kariya, Aichi-pref. (JP)

(72) Inventor: Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/258,499

(22) Filed: Apr. 22, 2014

(65) Prior Publication Data

US 2014/0312746 A1 Oct. 23, 2014

(30) Foreign Application Priority Data

Apr. 23, 2013 (JP) .................................. 2013-90273

(51) Int. Cl.
*H02K 5/04* (2006.01)
*H02K 5/15* (2006.01)
*H02K 29/08* (2006.01)
(Continued)

(52) U.S. Cl.
CPC ................. *H02K 11/21* (2016.01); *H02K 5/04* (2013.01); *H02K 5/15* (2013.01); *H02K 11/215* (2016.01); *H02K 29/06* (2013.01); *H02K 29/08* (2013.01);
(Continued)

(58) Field of Classification Search
CPC ...... H02K 11/0021; H02K 1/28; H02K 5/04; H02K 11/021; H02K 11/0073; H02K 29/08; H02K 29/03; H02K 2201/03; H02K 2213/03; H02K 11/21; H02K 29/06; H02K 11/215; H02K 5/15; H02K 5/16; H02K 5/1672

USPC ........ 310/156.45, 156.31, 425, 400–410, 89, 310/90, 68 B
See application file for complete search history.

(56) References Cited

U.S. PATENT DOCUMENTS 4,186,319 A * 1/1980 Dochterman .................... 310/89
2010/0148612 A1* 6/2010 Takemoto et al. ........ 310/156.53
(Continued)

FOREIGN PATENT DOCUMENTS

| JP | 2012005253 A | * | 1/2012 |
| JP | 2012-244706 |   | 12/2012 |
| JP | 2012244706 A | * | 12/2012 |

OTHER PUBLICATIONS

Banba Tatsunori, Rotor, Motor and Motor for Electric Power Steering, ASMO CO LTD, JP2012244706, Oct. 12, 2012.*
(Continued)

*Primary Examiner* — Terrance Kenerly
*Assistant Examiner* — Alexander Singh
(74) *Attorney, Agent, or Firm* — Nixon & Vanderhye P.C.

(57) ABSTRACT

A motor includes a stator core fitted to a cylindrical portion of a case, a rotor core being rotatable in the stator core, soft magnetic poles radially extending from the rotor core, and magnet poles disposed between the soft magnetic poles. The case includes a bottom portion having a ring-shaped plate portion, a protrusion portion, and a bearing-supporting portion extending from the protrusion portion. A condition that L2≥t and a condition that L1≥L2 are met, wherein t represents a thickness of the bottom portion, L1 represents a distance in an axial direction between a side surface of the ring-shaped plate portion close to the stator core and a protrusion end of the protrusion portion close to the rotor core, and L2 represents a distance in the axial direction between the side surface and an end surface of a bearing opposite to the rotor core.

11 Claims, 5 Drawing Sheets

(51) Int. Cl.
*H02K 29/06* (2006.01)
*H02K 29/03* (2006.01)

(52) U.S. Cl.
CPC ........... *H02K 29/03* (2013.01); *H02K 2201/03* (2013.01); *H02K 2213/03* (2013.01)

(56) References Cited

U.S. PATENT DOCUMENTS

2010/0181863 A1\* 7/2010 Murakami et al. ........... 310/215
2010/0301695 A1 12/2010 Yamada et al.
2011/0187215 A1\* 8/2011 Sahara ................... H02K 23/04
 310/89
2011/0309707 A1\* 12/2011 Kato et al. ............... 310/156.54
2014/0265706 A1 9/2014 Yamada et al.

OTHER PUBLICATIONS

Nagamoto Shinsuke, Motor, Jan. 5, 2012, ASMO Co LTD, JP 2012005253.\*

Office Action (4 pages) dated Apr. 14, 2015, issued in corresponding Japanese Application No. 2013-090273 and English translation (4 pages).

\* cited by examiner

ROTARY ELECTRIC MACHINE AND DRIVING APPARATUS USING THE SAME

CROSS REFERENCE TO RELATED APPLICATION

This application is based on Japanese Patent Application No. 2013-090273 filed on Apr. 23, 2013, the disclosure of which is incorporated herein by reference.

TECHNICAL FIELD

The present disclosure relates to a rotary electric machine and a driving apparatus using the rotary electric machine.

BACKGROUND

JP-2012-005252A (US 2011/0309707 A1) discloses a consequent-pole type motor in which half of magnetic poles are soft magnetic poles such that an amount of rare earth element is reduced. In this case, the rare earth element corresponds to a material of a permanent magnet included by a rotor used as a permanent magnet field. A rotor core and a stator core form a main magnetic circuit for generating a torque. It is well-known that a magnetic flux generated by the permanent magnet of the rotor is readily leaked from the main magnetic circuit. According to JP-2012-005252A, a distance of a gap disposed in an axial direction between a center portion of a bottom portion of a bottomed cylindrical case and the rotor core, is at least equal to and is at most ten times as a distance of a gap disposed in a radial direction between the stator core and the soft magnetic pole of the rotor.

A rotary position detecting portion, which uses a semiconductor magnetic sensor and a detecting magnet instead of using a resolver corresponding to a rotary position detector of a magnetic modulation type, is used in a control of a brushless motor. In this case, the semiconductor magnetic sensor may be a MR sensor including a magnetoresistive element, and the detecting magnet is used as a source for generating a detected signal. When the semiconductor magnetic sensor is disposed at a position along a rotary shaft of the brushless motor, a magnetic flux leaked from the motor disturbs the semiconductor magnetic sensor, and an accuracy of detecting a rotary position of the semiconductor magnetic sensor may deteriorate. According to JP-2012-005252A, a gap between the bottom portion of the bottomed cylindrical case and the rotor core is established to reduce the magnetic flux leaked from the bottomed cylindrical case toward the semiconductor magnetic sensor.

However, when the gap between the bottom portion of the bottomed cylindrical case and the rotor core is excessively small, a magnetic resistance of the gap decreases so that the magnetic flux passing through the bottomed cylindrical case increases. Therefore, the center portion becomes magnetically saturated, and the magnetic flux leaked from the bottomed cylindrical case toward the semiconductor magnetic sensor increases. The magnetic flux generated by the permanent magnet and flowing in an axial direction of a cylindrical portion of the bottomed cylindrical case flows radially in the bottom portion of the bottomed cylindrical case, and joins together at the center portion. Since the center portion has a magnetism-passage sectional area less than that of the cylindrical portion, the center portion is readily magnetically saturated.

When the bottom portion is formed by stamping to have a thickness increasing in accordance with a decrease in distance to the center portion, the center portion can be prevented from becoming magnetically saturated. However, it is difficult to use stamping to form the bottom portion. Therefore, a cost may increase.

SUMMARY

It is an object of the present disclosure to provide a rotary electric machine and a driving apparatus using the rotary electric machine. The rotary electric machine can restrict a reduction of a detection accuracy of a sensor.

According to an aspect of the present disclosure, a rotary electric machine includes a rotary shaft, a rotor core, a plurality of soft magnetic poles, a plurality of magnet poles, a stator, a case, a bearing, and a detecting magnet. The rotor core is fixed to the rotary shaft. The soft magnetic poles radially extend from the rotor core. The magnet poles are disposed between the soft magnetic poles. The stator is disposed radially outward of the soft magnetic poles and the magnet poles. The case includes a tubular portion fitted to an outer peripheral surface of the stator, a ring-shaped plate portion radially inwardly extending from an end of the tubular portion, a protrusion portion extending from an inner peripheral end of the ring-shaped plate portion toward the rotor core, and a bearing-supporting portion tube-shaped and extending from an inner peripheral end of the protrusion portion in a direction opposite to the rotor core. The bearing is fitted to an interior of the bearing-supporting portion, and rotatably supports the rotary shaft. The detecting magnet is disposed at an end portion of the rotary shaft opposite to the rotor core with respect to the bearing, and generates a magnetism field for detecting a rotary position of the soft magnetic pole and the magnetic pole.

According to the present disclosure, a condition that $L2 \geq t$ and a condition that $L1 \geq L2$ are met. In this case, t represents a thickness of the ring-shaped plate portion, L1 represents a distance in an axial direction of the rotary shaft between a side surface of the ring-shaped plate portion close to the stator core and a protrusion end of the protrusion portion close to the rotor core, and L2 represents a distance in the axial direction between the side surface and an end surface of the bearing opposite to the rotor core.

According to the above configuration, the protrusion portion of the case can be properly separated from the rotor core, and the bearing and the bearing-supporting portion can be properly separated from the detecting magnet. Since the protrusion portion of the case can be properly separated from the rotor core, the protrusion portion of the case can be prevented from becoming magnetically saturated, and a magnetic flux leaked from the case toward the sensor can be reduced. Further, since the bearing and the bearing-supporting portion can be properly separated from the detecting magnet, the magnetic flux induced by the bearing can be restricted from disturbing the sensor. Thus, a reduction in a detection accuracy of the sensor can be restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, an embodiment of the present disclosure will be described.

Embodiment

Figure 1:
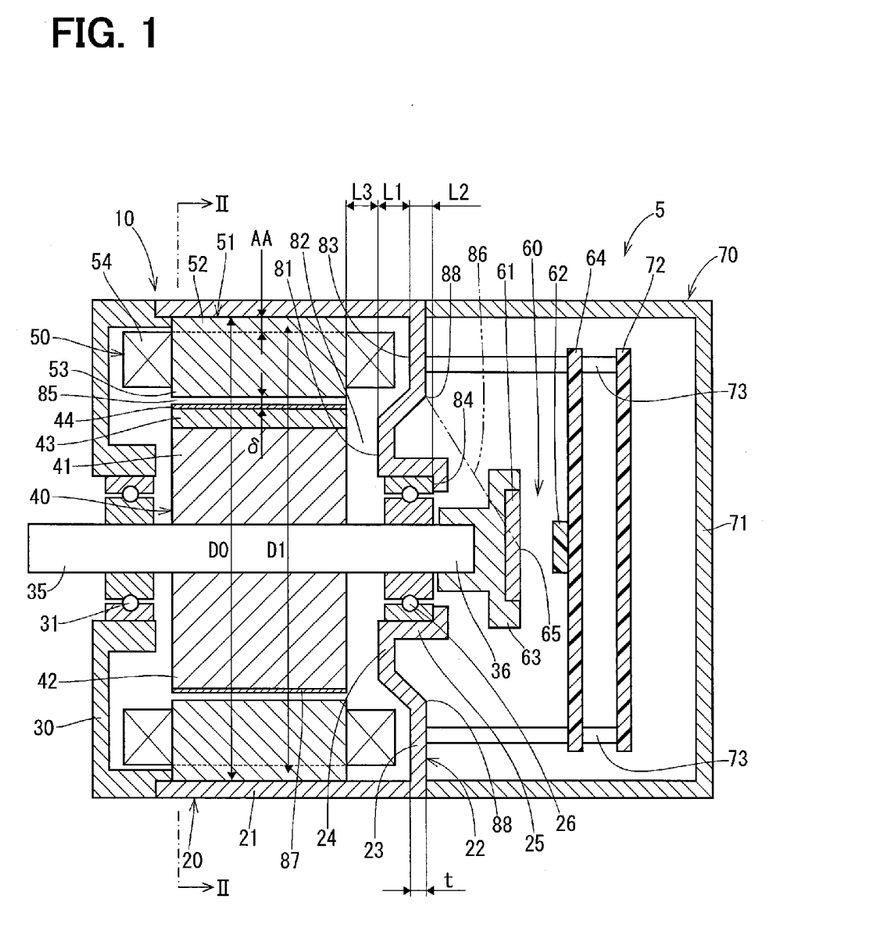
FIG. 1 is a diagram showing a driving apparatus having a motor, according to an embodiment of the present disclosure.

FIG. 1 is a diagram showing a driving apparatus 5 applied to a motor 10 corresponding to a rotary electric machine according to an embodiment of the present disclosure. The driving apparatus 5 is used as a power source of a power steering for a vehicle.

Figure 2:
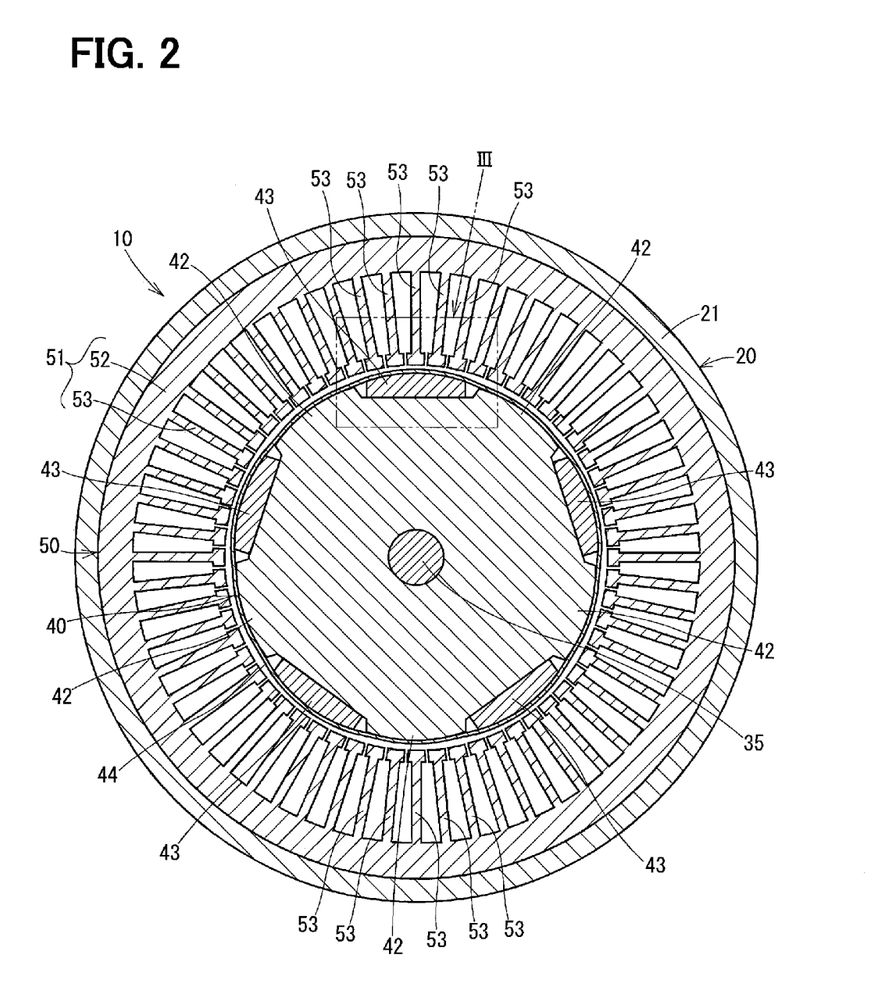
FIG. 2 is a sectional view of the motor viewed from a line II-II in FIG. 1.

First, referring to FIGS. 1 and 2, a configuration of the driving apparatus 5 will be described. The driving apparatus 5 is a mechanically and electrically integrated type driving apparatus integrally provided with the motor 10 and a control device 70 controlling the motor 10.

The motor 10 is a brushless motor provided with three phases, and includes a case 20, a first cover 30, a first bearing 26, a second bearing 31, a rotary shaft 35, a rotor 40, a stator 50, and a position detecting portion 60.

The case 20 is a stamping product of a plate member that is made of a soft magnetic material, and includes a cylindrical portion 21 and a bottom portion 22 blocking a first end of the cylindrical portion 21. The cylindrical portion 21 is fitted to an outer peripheral surface of the stator 50. According to the present embodiment, the cylindrical portion 21 is cylindrical shaped. However, according to the present disclosure, the cylindrical portion 21 may correspond to a tubular portion that is tubular shaped. The bottom portion 22 includes a ring-shaped plate portion 23, a protrusion portion 24, and a bearing-supporting portion 25. The ring-shaped plate portion 23 radially inwardly extends from the first end of the cylindrical portion 21. The protrusion portion 24 extends from an inner peripheral end 88 of the ring-shaped plate portion 23. According to the present embodiment, the protrusion portion 24 extends in an extension direction toward the rotor core 41. The bearing-supporting portion 25 which is tube-shaped extends from an inner peripheral end of the protrusion portion 24 in a direction opposite to the extension direction. The first bearing 26 is fitted to an interior of the bearing-supporting portion 25.

The first cover 30 a stamping product of a plate member that is made of a soft magnetic material, and blocks a second end of the cylindrical portion 21. The second bearing 31 is disposed in a center portion of the first cover 30.

The rotary shaft 35 is rotatably supported by the first bearing 26 and the second bearing 31.

The rotor 40 is a field magnet of the motor 10, and includes a rotor core 41, a plurality of soft magnetic poles 42, a plurality of magnet poles 43, and a magnet cover 44. According to the present embodiment, the rotor 40 corresponds to a permanent field magnet. The rotor core 41 is fixed to the rotary shaft 35. Each soft magnetic pole 42 radially extends from the rotor core 41. According to the present embodiment, the rotor core 41 and the soft magnetic pole 42 are formed by the same member. Each magnet pole 43 is formed by a permanent magnet, and is disposed between the soft magnetic poles 42. The magnet pole 43 has a magnetization direction corresponding to a radial direction of the rotor 40. The magnet poles 43 are disposed such that the same polarity of each magnet pole 43 is positioned radially outward of the rotor 40. The magnet cover 44 is made of a non-magnetism material, and covers the soft magnetic pole 42 and the magnet pole 43 to prevent the magnet pole 43 from separating from the soft magnetic pole 42.

The rotor 40 is a consequent-pole type rotor provided with the magnet pole 43 and the soft magnetic pole 42 which are arranged alternately with each other. According to the present embodiment, the rotor 40 includes ten magnetic poles. The magnet pole 43 and the soft magnetic pole 42 are disposed such that the rotary shaft 35 is positioned between the magnet pole 43 and the soft magnetic pole 42 in a radial direction of the rotary shaft 35.

The stator 50 is an armature of the motor 10, and is disposed radially outward of the rotor 40. The motor 10 is an inner-rotor type motor. The stator 50 includes a stator core 51 and a winding wire 54. The stator core 51 includes a yoke 52 and a plurality of teeth 53. The yoke 52 which is cylindrical shaped is fitted to an interior of the cylindrical portion 21. The teeth 53 radially inwardly extend from the yoke 52. According to the present embodiment, the yoke 52 is cylindrical shaped. However, according to the present disclosure, the yoke 52 may be tubular shaped. The winding wire 54 includes a U-phase winding wire, a V-phase winding wire, and a W-phase winding wire. The winding wire 54 winds around slots between the teeth 53. According to the present embodiment, the winding wire 54 winds at a full pitch winding. The winding wire 54 is electrically connected to an external power source via a cable not shown. Further, the winding wire 54 is not shown in FIG. 2.

The position detecting portion 60 detects a rotary position of the magnetic poles of the rotor 40, and includes a detecting magnet 61 and a sensor 62. The detecting magnet 61 is fixed to an end portion 36 of the rotary shaft 35 via a supporting member 63. The end portion 36 is a part of the rotary shaft 35 opposite to the rotor core 41 with respect to the first bearing 26. The detecting magnet 61 generates a magnetism field for detecting the rotary position. According to the present embodiment, the detecting magnet 61 is columnar-shaped, and has a magnetization direction corresponding to a radial direction of the detecting magnet 61.

The sensor 62 is a semiconductor magnetic sensor disposed at a position of a control substrate 64 opposite to the first bearing 26 with respect to the detecting magnet 61. Further, the sensor 62 is disposed at a rotary axis center of the rotary shaft 35. In other words, the sensor 62 is disposed to face the detecting magnet 61 in an axial direction of the rotary shaft 35. According to the present embodiment, the sensor 62 includes a magnetoresistive element sensing a magnetism field parallel to a sensing surface. The magnetoresistive element outputs a signal corresponding to a magnitude of an inner resistance varying according to a rotation of the rotary shaft 35. The sensor 62 obtains the rotary position of the magnetic poles of the rotor 40 based on the signal transmitted from the magnetoresistive element, and outputs the rotary position to the control device 70.

The control device 70 includes a second cover 71 and a circuit substrate 72. The second cover 71 which is tubular-shaped includes a bottom part, and an opening part fixed to the bottom portion 22. The circuit substrate 72 and the control substrate 64 are both fixed to the bottom portion 22 by a stud 73. The circuit substrate 72 generates a rotary magnetism field rotating around the rotary axis center, according to the rotary position transmitted from the sensor 62. In other words, the circuit substrate 72 generates the rotary magnetism field, by switching to energize the U-phase winding wire, the V-phase winding wire, and the W-phase winding wire in an order according to the rotary position. The rotor 40 is rotated according to the rotary magnetism field.

Figure 3:
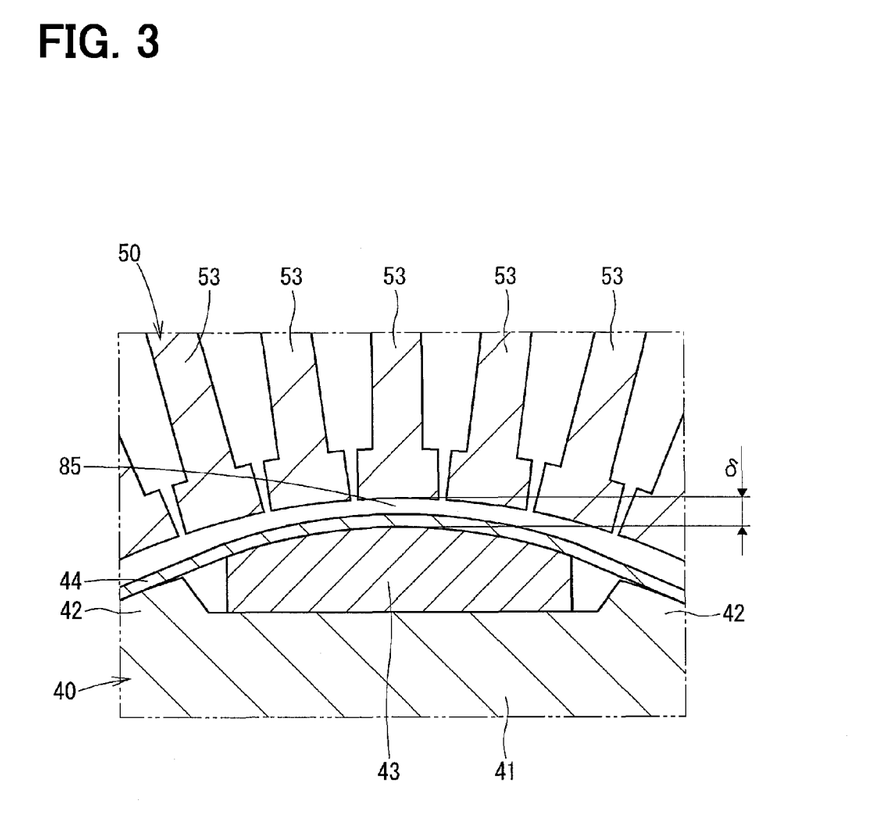
FIG. 3 is an enlarged view of a section III in FIG. 2.

Next, referring to FIGS. 1 to 3, a configuration of the motor 10 will be described.

A part of a magnetic flux generated by the magnet poles 43 flows separately in a direction parallel to the axial direction, after flowing through the stator core 51 to the cylindrical portion 21. When the magnetic flux flows through a position close to a center of the magnet pole 43 in a peripheral direction, the magnetic flux relatively flows in the direction parallel to the axial direction. When the magnetic flux flows through a position far away from a center of the magnet pole 43 in the peripheral direction, the magnetic flux flows in a direction inclining to the soft magnetic pole 42 with respect to the axial direction. The magnetic flux reached the ring-shaped plate portion 23 radially flows toward the protrusion portion 24 at a magnetic flux density having variation in the peripheral direction. Then, the magnetic flux flows through a first gap 82 to the rotor core 41. In this case, the first gap 82 is a gap between a protrusion end 81 of the protrusion portion 24 and the rotor core 41. The cylindrical portion 21, the ring-shaped plate portion 23, and the protrusion portion 24, form a return magnetic path to return the magnetic flux, which is leaked from a main magnetic circuit generating a torque, back to the rotor 40. In other words, the cylindrical portion 21, the ring-shaped plate portion 23, and the protrusion portion 24, are functioned as a magnetic shield disposed between the rotor 40 and the sensor 62.

A first thickness t represents a thickness of the bottom portion 22. A first distance L1 represents a distance in the axial direction between a side surface 83 of the ring-shaped plate portion 23 close to the stator core 51 and the protrusion end 81 of the protrusion portion 24 close to the rotor core 41. A second distance L2 represents a distance in the axial direction between the side surface 83 and an end surface 84 of the first bearing 26 opposite to the rotor core 41. According to the present embodiment, the second distance L2 is greater than or equal to the first thickness t (L2≥t), and the first distance L1 is greater than or equal to the second distance L2 (L1≥L2). Therefore, the protrusion portion 24 can be properly separated from the rotor core 41, and the first bearing 26 and the bearing-supporting portion 25 can be properly separated from the detecting magnet 61.

When the protrusion portion 24 and the rotor core 41 is too close to each other, a magnetic resistance of the first gap 82 becomes smaller, and the magnetic flux flowing through the case 20 increases. When the magnetic flux flowing through the case 20 increases, an interlinkage magnetic flux flowing though the winding wire 54 is reduced, and a performance of the motor 10 decreases. Further, the bottom portion 22 becomes magnetically saturated, and the magnetic flux is leaked toward the sensor 62. When the magnetic flux leaked toward the sensor 62 increases, an accuracy of detecting the rotary position by the sensor 62 may deteriorate. According to the present embodiment, the accuracy corresponds to a detection accuracy.

When both the first bearing 26 and the bearing-supporting portion 25 are too close to the detecting magnet 61, the magnetic flux induced by the first bearing 26 is disposed in the magnetism field for detecting the rotary position, and the detection accuracy may deteriorate.

When the second distance L2 is greater than or equal to the first thickness t (L2≥t), and the first distance L1 is greater than or equal to the second distance L2 (L1≥L2), a reduction in the detection accuracy due to a distance between the protrusion portion 24 and the rotor core 41 or a distance between the first bearing 26, the bearing-supporting portion 25, and the detecting magnet 61 can be restricted.

For example, when a distance between the protrusion end 81 and the end surface 84 in the axial direction is equal to 10 mm, the first distance L1 can be set to 7 mm, and the second distance L2 can be set to 3 mm, such that a condition that the first distance L1 is greater than or equal to the second distance L2 (L1≥L2) is met. Further, the first thickness t can be set to 2 mm, such that a condition that the second distance L2 is greater than or equal to the first thickness t (L2≥t) is met.

It is necessary to properly set a magnetism-passage sectional area of the bottom portion 22 to effectively prevent the case 20 from becoming magnetically saturated. According to the present embodiment, an outer diameter of the yoke 52 is referred to as a maximum diameter D0, an average diameter of the yoke 52 is referred to as an average diameter D1, and a thickness of the yoke 52 in a radial direction of the yoke 52 is referred to as a second thickness AA. The first thickness t is set to meet a condition that t≥(D1×AA)/(2×D0). The average D1 is a result of dividing a sum of the maximum diameter D0 and an inner diameter of the yoke 52 by 2. According to the above description, over 90% of the magnetic flux leaked from the stator core 51 can be returned to the return magnetic path.

For example, when the maximum diameter D0 is equal to 80 mm, the magnetism-passage sectional area of the bottom portion 22 corresponding to an outer peripheral surface of the yoke 52 is equal to (80π×t). When the average diameter D1 is equal to 76 mm, and when the second thickness AA is equal to 4 mm, the first thickness t can be set to 2 such that the condition that t (D1×AA)/(2×D0) is met.

The magnetic flux leaked from the main magnetic circuit generated by the rotor core 41 and the stator core 51 increases in accordance with an increase in minimum distance 6 of a second gap 85 disposed between the soft magnetic pole 42, the magnet pole 43, and the teeth 53, in the radial direction of the rotor core 41, or in accordance with an increase in first thickness t. The magnetic flux leaked from the main magnetic circuit is readily returned by reducing a magnetic resistance of the return magnetic path. However, when the magnetic resistance of the return magnetic path is excessively reduced, the magnetic flux leaked from the main magnetic circuit increases.

According to the present embodiment, a third distance L3 represents a distance of the first gap 82 disposed in the axial direction between the protrusion end 81 and the rotor core 41. The third distance L3 is set to meet a condition that L3≥3/(6×t). Since a lower limit of the third distance L3 is set, an increase of the magnetic flux leaked from the main magnetic circuit can be restricted.

For example, when the minimum distance δ is equal to 0.7 mm, and when the first thickness t is equal to 2 mm, the third distance L3 is set to be greater than or equal to 2.1 mm to meet the condition that L3≥3/(δ×t).

According to the present embodiment, to effectively prevent the magnetic flux induced by the first bearing 26 from disturbing the sensor 62, the bearing-supporting portion 25 and the first bearing 26 are disposed at a position close to the rotor 40 (rotor core 41) with respect of an imagination line 86. The imagination line 86 corresponds to a line connecting the inner peripheral end 88 to a center 65 of an end surface of the detecting magnet 61. Therefore, the third distance is prevented from becoming unnecessarily greater, and an increase in size of the motor 10 can be prevented.

Further, the soft magnetic pole 42 has an outer side surface 87 corresponding to a surface disposed radially outward of the soft magnetic pole 42. The outer side surface 87 is a curved surface extending radially outwardly to have an arc shape. Therefore, a distance of the second gap 85 disposed between the outer side surface 87 and the teeth 53 is minimum at a center of the outer side surface 87 in a direction along a periphery of the outer side surface 87. Thus, an output property of the main magnetic circuit is improved, and a cogging torque causing to oscillate and a torque ripple property can be optimized.

As the above description, in the motor 10 according to the present embodiment, the first distance L1 and the second distance L2 are set to meet the condition that the first distance L1 is greater than or equal to the second distance L2 (L1≥L2) and the condition that the second distance L2 is greater than or equal to the first thickness t (L2≥t). Therefore, the protrusion portion 24 can be properly separated from the rotor core 41, and the first bearing 26 and the bearing-supporting portion 25 can be properly separated from the detecting magnet 61. Thus, the reduction in the detection accuracy due to the distance between the protrusion portion 24 and the rotor core 41 or the distance between the first bearing 26, the bearing-supporting portion 25, and the detecting magnet 61 can be restricted.

According to the present embodiment, the first thickness t is set to meet the condition that t≥(D1×AA)/(2×D0). Therefore, the case 20 is effectively prevented from becoming magnetically saturated.

According to the present embodiment, the third distance L3 is set to meet the condition that L3≥3/(δ×t). Since the lower limit of the third distance L3 is set, the increase of the magnetic flux leaked from the main magnetic circuit can be restricted.

According to the present embodiment, the bearing-supporting portion 25, the first bearing 26, and the rotor 40 are disposed in the area divided by the imagination line 86. Therefore, the increase in size of the motor 10 can be prevented, and the magnetic flux induced by the first bearing 26 can be effectively prevented from disturbing the sensor 62.

According to the present embodiment, the cylindrical portion 21, the ring-shaped plate portion 23, the protrusion portion 24, and the bearing-supporting portion 25 are made of the same material. Therefore, since the case 20 corresponding to the magnetic shield is formed by a deep drawing process, a dimension accuracy can be improved, and a man-hour can be reduced.

Further, in the driving apparatus 5 having the control device 70 mounted to the bottom portion 22, a balance between a performance of the magnetic shield and an increase in size of the driving apparatus 5 can be obtained.

Other Embodiment

Figure 4:
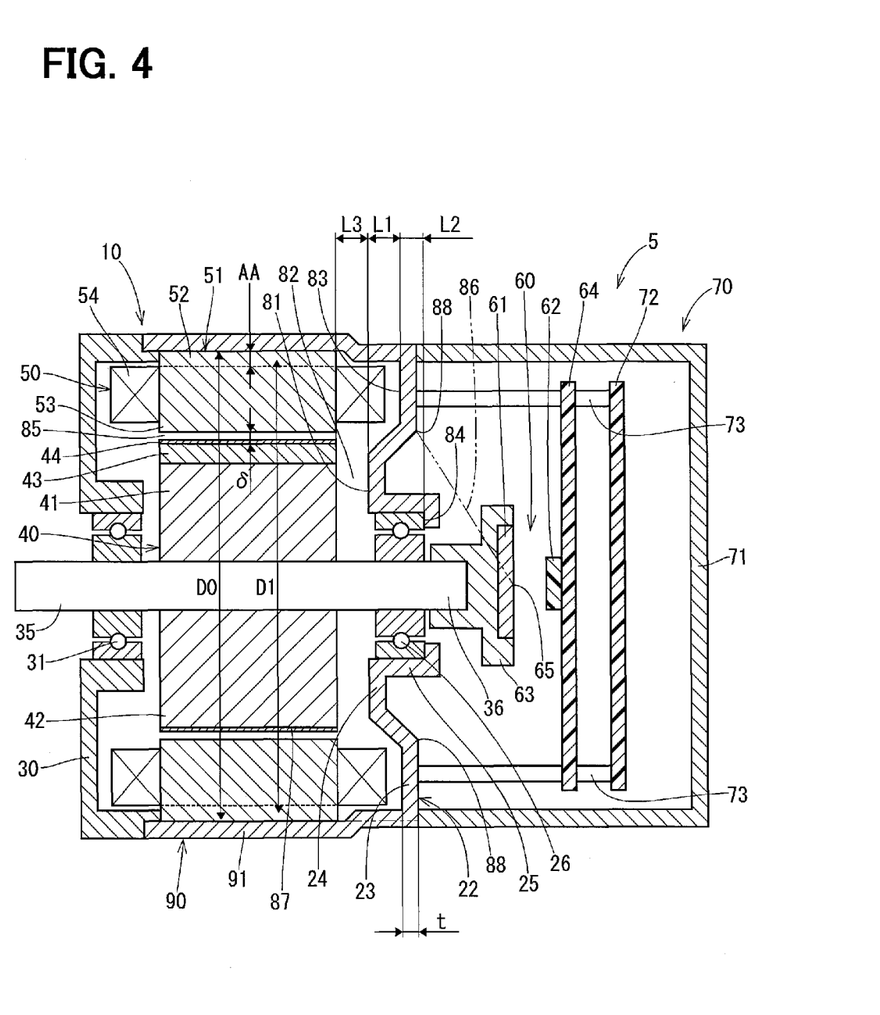
FIG. 4 is a diagram showing a driving apparatus according to a modification.
Figure 5:
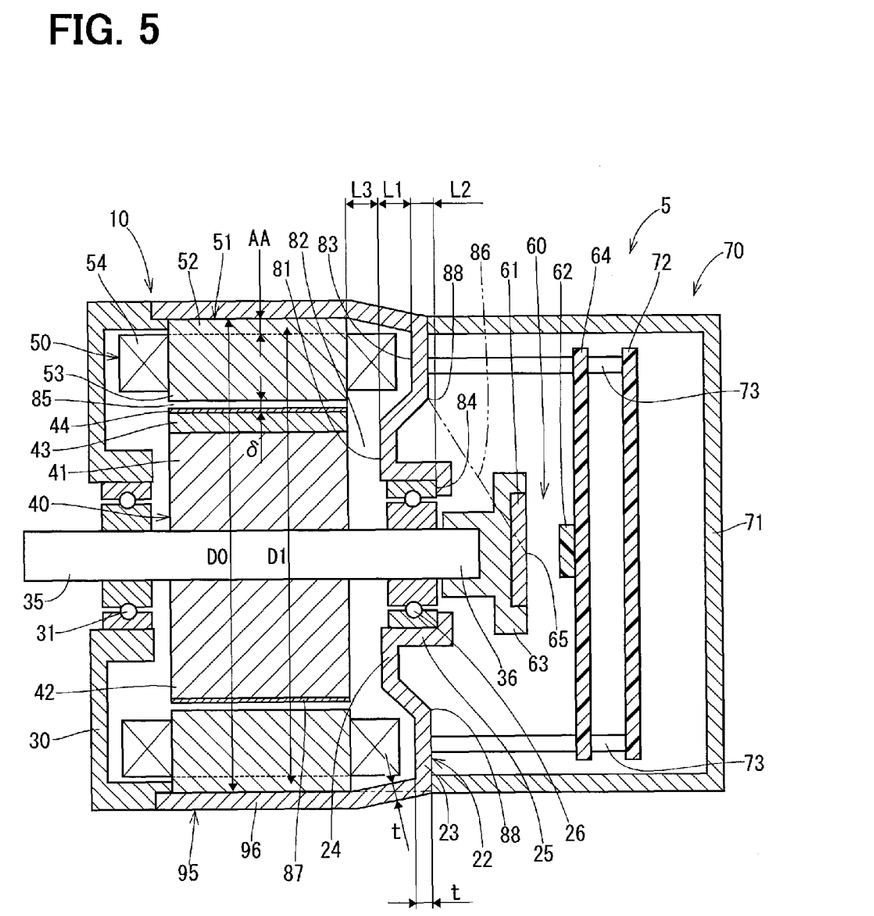
FIG. 5 is a diagram showing a driving apparatus according to another modification.

According to other embodiment, as shown in FIG. 4, a case 90 includes a cylindrical portion 91 and the bottom portion 22. The cylindrical portion 91 has a step portion. Alternatively, as shown in FIG. 5, a case 95 includes a cylindrical portion 96 and the bottom portion 22. The cylindrical portion 96 has a taper portion tilted from an outer peripheral end of the bottom portion 22. The magnetism-passage sectional area can be established according to the first thickness t.

The sensor may include other elements except for the magnetoresistive element. For example, the sensor can include a hall element.

A number of magnetic poles of the rotor core may be a value rather than ten. As shown in FIG. 2, a number of slots of the stator core is equal to sixty. However, the number of slots of the stator core may be a value rather than sixty.

According to the above embodiment, the winding wire of the stator core winds at a full pitch winding. However, the winding wire can wind at other windings such as a short pitch winding, a wave winding, or a lap winding.

According to the above embodiment, the case is a stamping product. However, the case may be a casting product.

The rotor core and the stator core may be disposed at a laminated body of an electromagnetic steel plate.

The motor may be used for a device rather than a power steering for a vehicle.

The present disclosure is not limited to the embodiments mentioned above, and can be applied to various embodiments within the spirit and scope of the present disclosure.

What is claimed is:

1. A rotary electric machine comprising:
a rotary shaft;
a rotor core fixed to the rotary shaft;
a plurality of soft magnetic poles radially extending from the rotor core;
a plurality of magnet poles disposed between the soft magnetic poles;
a stator disposed radially outward of the soft magnetic poles and the magnetic poles;
a case including
a tubular portion fitted to an outer peripheral surface of the stator,
a ring-shaped plate portion radially inwardly extending from an end of the tubular portion,
a protrusion portion extending from an inner peripheral end of the ring-shaped plate portion toward the rotor core, and
a bearing-supporting portion tube-shaped and extending from an inner peripheral end of the protrusion portion in a direction opposite to the rotor core;
a bearing fitted to an interior of the bearing-supporting portion, the bearing rotatably supporting the rotary shaft; and
a detecting magnet disposed at an end portion of the rotary shaft opposite to the rotor core with respect to the bearing, the detecting magnet generating a magnetism field for detecting a rotary position of the soft magnetic pole and the magnetic pole, wherein
a condition that L2≥t and a condition that L1≥L2 are met, wherein t represents a thickness of the ring-shaped plate portion, L1 represents a distance in an axial direction of the rotary shaft between a side surface of the ring-shaped plate portion close to the stator core and a protrusion end of the protrusion portion close to the rotor core, and L2 represents a distance in the axial direction between the side surface of the ring-shaped plate portion and an end surface of the bearing opposite to the rotor core;

a side surface of the ring-shaped plate portion of the case opposite to the rotor core is interposed between the end surface of the bearing opposite to the rotor core and the rotor core in an axial direction of the rotary shaft;

an end surface of the bearing close to the rotor core is interposed between a side surface of the ring-shaped plate portion of the case close to the rotor core and the rotor core in the axial direction of the rotary shaft, and a condition that L4=L1+L3+L2 and a condition that L4≥L1+L3 are met, wherein L3 represents a distance of a first gap disposed in the axial direction between the protrusion end of the protrusion portion of the case and the rotor core, and L4 represents a distance between the rotor core and the end surface of the bearing opposite to the rotor core.

2. The rotary electric machine according to claim 1, wherein
the stator includes
a yoke tubular shaped and fitted to an interior of the tubular portion of the case, and
a plurality of teeth radially inwardly extending from the yoke, and
a condition that t≥(D1×AA)/(2×D0) is met, wherein D0 represents the maximum diameter of the yoke, D1 represents an average diameter of the yoke, and AA represents a thickness of the yoke in a radial direction of the yoke.

3. The rotary electric machine according to claim 1, wherein
a condition that L3≥3/(δ×t) is met and δ represents a minimum distance of a second gap disposed between the soft magnetic pole, the magnetism pole, and the teeth, in a radial direction of the rotor core.

4. The rotary electric machine according to claim 3, wherein
the soft magnetic pole has an outer side surface corresponding to a surface disposed radially outward of the soft magnetic pole, the outer side surface is a curved surface extending radially outwardly to have an arc shape, and a distance of the second gap disposed between the outer side surface and the stator is minimum at a center of the outer side surface in a direction along a periphery of the outer side surface.

5. The rotary electric machine according to claim 1, wherein
the bearing-supporting portion and the bearing are disposed at a position close to the rotor core with respect of an imagination line, wherein the imagination line corresponds to a line connecting the inner peripheral end of the ring-shaped plate portion to a center of an end surface of the detecting magnet.

6. The rotary electric machine according to claim 1, wherein
the tubular portion, the ring-shaped plate portion, the protrusion portion, and the bearing-supporting portion, are made of the same material.

7. A driving apparatus comprising:
the rotary electric machine according to claim 1; and
a control device mounted to the ring-shaped plate portion, the control device including a control substrate provided with a sensor facing the detecting magnet in the axial direction.

8. The rotary electric machine according to claim 1, wherein
the ring-shaped plate portion is placed at a position within a thickness of the bearing in the axial direction of the rotary shaft.

9. The rotary electric machine according to claim 1, wherein
a thickness of the ring-shaped plate portion in the axial direction of the rotary shaft is less than a thickness of the bearing in the axial direction of the rotary shaft.

10. The rotary electric machine according to claim 9, wherein
the thickness of the ring-shaped plate portion in the axial direction of the rotary shaft overlaps with the thickness of the bearing in the axial direction of the rotary shaft.

11. The rotary electric machine according to claim 1, wherein
the stator includes a winding wire, and an end surface of the winding wire is arranged at a position between the side surface of the ring-shaped plate portion close to the stator core and a protrusion end of the protrusion portion close to the rotor core.

* * * * *